INVENTOR
John G. Bayly

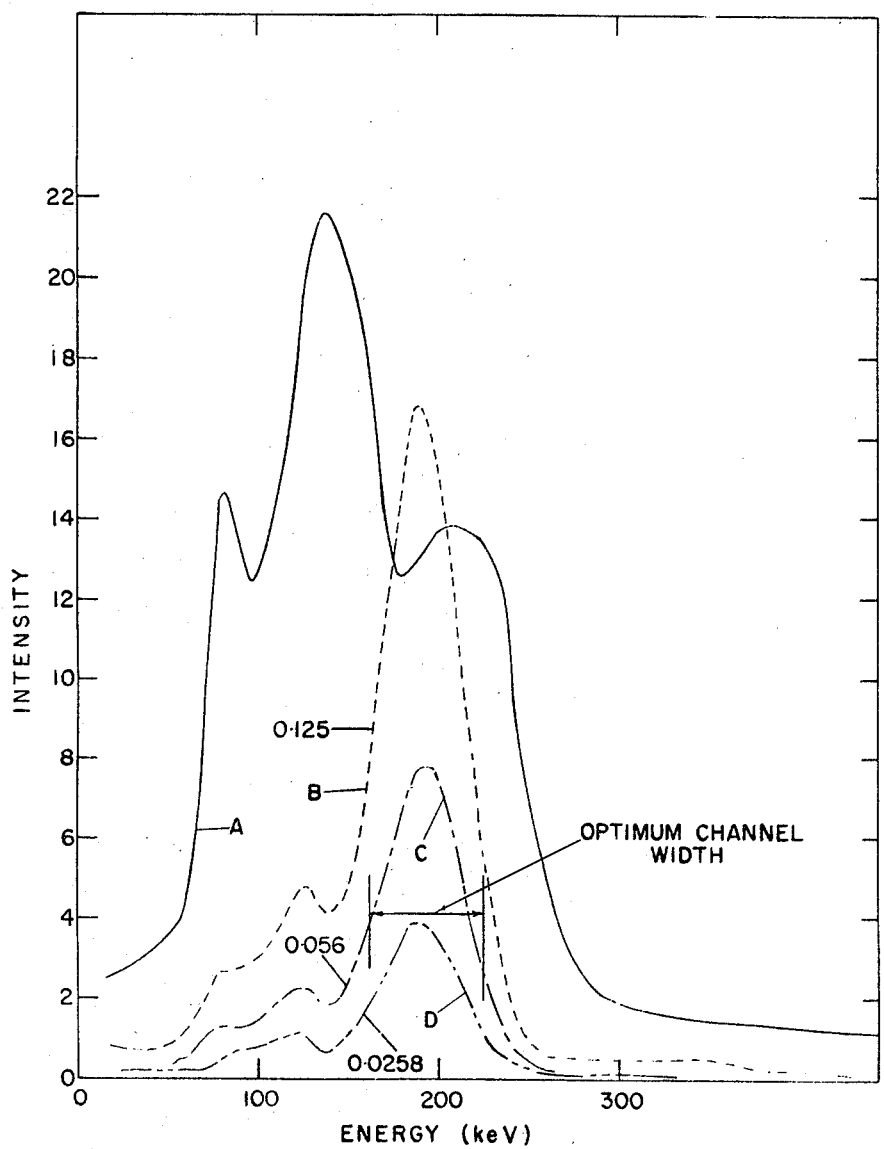

BY Birch and O'Brien
ATTORNEYS

United States Patent Office 3,470,372
Patented Sept. 30, 1969

3,470,372
FOG DENSITY MEASUREMENT BY X-RAY SCATTERING
John G. Bayly, Deep River, Ontario, Canada.; may be granted to U.S. Atomic Energy Commission under the provisions of 42 U.S.C. 2182
Continuation of application Ser. No. 298,993, July 31, 1963. This application Jan. 10, 1966, Ser. No. 523,002
Int. Cl. G01n 9/24
U.S. Cl. 250—43.5                    12 Claims

ABSTRACT OF THE DISCLOSURE

An apparatus for determining the density of a light substance confined within a material of greater density employing a source of mono-kinetic photons with an energy sufficient to pass through the greater density material and then pass out again after Compton scattering by electrons in the light substance. The photons are collimated both before and after scattering and those scattering at a predetermined angle are detected along with those photons scattered other than by the single Compton scattering. The detector includes means for generating output pulses whose amplitudes are dependent upon the energy of photons encountered by the detector and the apparatus includes means for selecting pulses of the amplitude range effected by the Compton scattering and of a second amplitude range effected by photons arriving from other than the Compton scattering. Means are included for comparing the two intensities which is a function of the density of the light substance.

---

This invention, which is a continuation of the now abandoned application, Ser. No. 298,993, filed July 31, 1963, relates to a method and apparatus for determining the density of a substance which is confined within an enclosure which may not be breached. It is particularly suitable when it is undesirable or impossible to introduce probes or tapping points through the wall, or when it is unsatisfactory to place a window in the wall.

Recent interest in fog as a nuclear reactor coolant has led to a need for a method of measuring steam quality under conditions of temperature, pressure and velocity which approach the engineering limits for thermal engines. When a water fog is used experimentally as a reactor coolant it is necessary to know how much water is present in the form of droplets and how much is in the vapor phase. These quantities determine the steam quality, or weight percent of the water vapor.

Because the pipe carrying steam is operating under such extreme conditions, it is unsatisfactory to probe into the pipe or to attempt to examine conditions within it through a window in the wall of the pipe.

It is an object of the invention to meet the difficulties presented in the present state of the art and to determine the density of fog within a high-pressure, high temperature steam pipe by a method which merely requires access to the outer surface of the pipe.

In accordance with the teaching of the invention, there is provided the method of determining the density of a light substance confined by a material wall which comprises the steps of, generating a monokinetic beam of photons at an energy greater than that necessary to penetrate said material, collimating said beam, allowing said beam to pass through said confining material and to undergo Compton scattering by electrons in said substance, collimating photons scattering at a predetermined angle to the incident beam and detecting the intensity of said collimated scattered photons, within a predetermined energy range, comparing the detected intensity with a quantity dependent upon the intensity of the incident beam, said compared value being dependent upon said density of said light substance, said predetermined angle being determined by the geometry of the material and chosen so that the photons scattered by said material and detected in said detector have energies in a readily detected range of values. Steam quality can easily be found from a determination of density of the fog since it is a simple function of density and temperature or pressure. The steam quality can be accurately measured under conditions of high temperatures pressure and velocity as occur in a power reactor or high efficiency steam plant.

In accordance with the teaching of the invention there is also provided apparatus for determining the density of a light substance confined by a material of greater density comprising, a photon source, said source producing a majority of photons which are essentially monokinetic at an energy sufficient to pass through said confining material after Compton scattering by electrons in said substance, means for collimating photons from said source, means for collimating photons scattered by electrons in said substance at a predetermined angle to said incident photons, means for detecting intensity of said collimated scattered photons within a predetermined energy range, means for determining the intensity of said incident photons and means for comparing the intensity of said scattered photons with said intensity of said incident photons.

The use of penetrating radiation has been proposed in the past for measuring both the average density and density distribution of the contents of a vessel. The ratio of transmitted to incident intensity depends upon the total absorption between source and detector and hence on the mean density of material in the path of radiation. However, when this method is applied to determining the density of a light substance such as a water fog confined by material of very much greater density and of considerable thickness (as is required under the stringent conditions of a power plant), the walls of the tube produce an overwhelmingly greater effect than that of the fog so that accurate determination of the fog density cannot be obtained. In carrying out the teaching of the present invention, it is proposed to subject a water fog to an irradiation by an accurately collimated gamma ray beam and to determine the intensity of the Compton scattering only as it originates within the fog.

The development and formulation of practical embodiments of this invention will now be described with reference to the accompanying drawings in which:

FIGURE 5 shows a graph of the intensity of photons incident on the detector at progressively increasing energy levels for the apparatus of FIGURE 1 in the absence of fog within the tube and also three graphs representing the intensity difference obtained by subtracting the output from the detector in the absence of fog from that in the presence of the fog, for three separate fog density levels;

Figure 1:
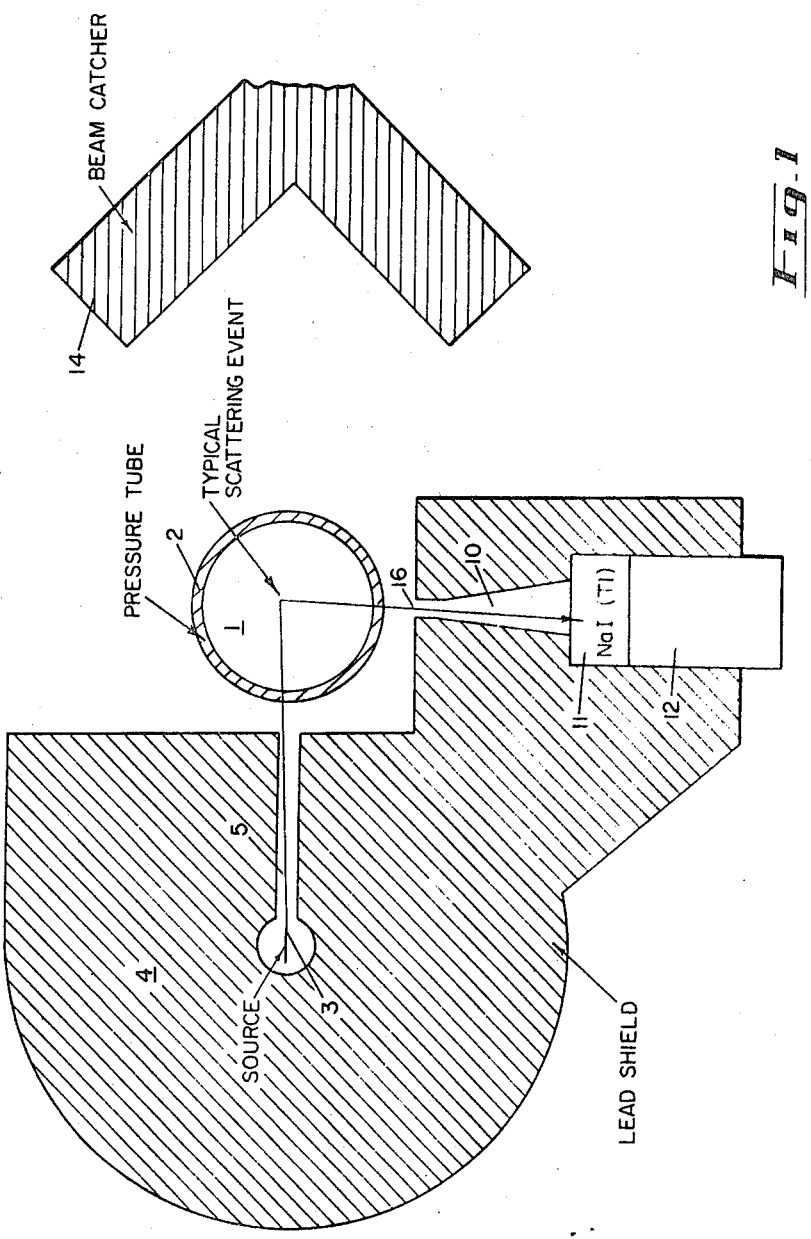
FIGURE 1 shows a section of one embodiment of the invention employing a radioactive source and a photomultiplier detector.

Compton scattering has been well studied in the past and the intensity of gamma radiation scattered by an electron depends both upon the scattering angle and the intensity and energy of the incident radiation. Detailed descriptions of this effect are readily available, see for instance Beta and Gamma Ray Spectroscopy, K. Siegbahn, published by North Holland Pub. Co. 1955: and Experimental Nuclear Physics, vol. 1–E. Segre, published by Wiley, 1953. It has been shown that the photons scattered at the angle $\theta$ have energies of $$k = \frac{k_o}{1+k_o(1-\cos\theta)}$$

where $k_o$ is the original photon energy in units of $m_e c^2 = 511$ kev. ($m_e$ being the rest mass of the electron and $c$ the velocity of light). Thus, if the photon source produces $\gamma$-rays of one energy $k_o$, the usefully scattered photons will also be monokinetic at an energy of $$k_o/1+k_o$$

if $\theta$ equals 90°. The advantage of choosing a value of $\theta$ in the region of 90° is that small angular variations of scatter produce only minor changes in the energy of the scattered photons. Such photons being of a particular energy range can readily be distinguished from the $\gamma$-ray background radiation resulting from multiple scattering by the vessel material, radioactive particles in the fog or steam, etc. It is clear that in addition to being monokinetic, the incident $\gamma$ radiation should be collimated so that the angle of scatter can be accurately controlled. Further, to assist in collimation, the source of radiaiton should be small and of high specific activity.

In a typical application, it may be necessary to measure the density of the fog within a steel pressure tube having a diameter of 6±2 cm. with a wall thickness of 5±3 mm. To ensure that at least half of the radiation scattered by the fog penetrates 5 mm. of steel, the $\gamma$-ray energy after scattering must exceed 180 kev. Since energy is lost in the scattering process this sets a lower limit of 300 kev. for the $\gamma$-ray energy at the source.

An upper limit is implied by the collimation requirement that the incident beam should not strike the pressure tube at a point from which $\gamma$-rays can scatter directly to the detector. This limit is not easily defined: it depends not only on scattering in the incident beam collimator, but also on the geometry of the structure. As the $\gamma$-ray energy is increased, the photoelectric absorption cross section drops much more rapidly than the scattering cross section. Thus any collimator becomes less efficient as the photon energy is increased. The scattering and absorption cross sections are equal at 500 kev. and this may be taken as an approximate upper limit.

The fog scattering process is inefficient in the sense that only of the order of $10^{-7}$ of the photons from the source produce useful pulses in the detector. It is necessary to reduce the background due to direct transmission through the shielding by a comparable factor. While six centimeters of lead are adequate for this at photon energies below 300 kev., twenty are needed at 600 kev. and forty at 1.5 mev. Thus, the source should be as free as possible from high energy photon emitters.

Finally, the intensity should be constant. If an X-ray machine is used it should be well stabilized; if a radioactive source is used, its half-life should be at least several weeks.

Having reference now to FIGURE 1, which shows equipment for measuring the density of the contents 1 of a steel tube or pipe 2, a $\gamma$-ray source 3 is contained within lead shielding 4 and includes a collimating passage 5. Photons scattered from within the tube 2 enter a collimating passage 10 and are intercepted by a sodium iodide thallium scintillator whose output is detected and amplified by photo-multiplier 12. The photo-multiplier may suitably be a Dumont 6292 and is followed by a linear pre-amplifier which amplifies all input pulses by the same factor such as an A.E.C.L. EB5230 developed by R. McNaughton. The pre-amplifier may feed a two-channel analyser 13. This device accepts pulses within two particular ranges of amplitudes from the pre-amplifier and converts each pulse into another of standard height and each standard pulse is delivered through one or other channel dependent upon the range within which the pulses from the pre-amplifier fell. A suitable analyser is the A.E.C.L. EB5134 which yields pulses of six volt amplitube and duration of up to 2 $\mu$sec. A beam catcher 14 protects operating personnel from photons passing through the tube 2.

A radioactive material for source 3 which approximates the requirements of emitting photons above a lower limit of 300 kev., but not too greatly in excess of this (say less than 600 kev.), is $Cr^{51}$. This nuclide decays by electron capture with a 28 day half-life, 9% of its transitions exciting a $V^{51}$ level which emits a 323 kev. $\gamma$-ray. In addition to this monokinetic radiation there is a very weak 650 kev. line and the internal bremsstrahlung.

A supply of $Cr^{51}$ was produced by neutron irradiation of $Cr^{50}$, which has a cross section of $16 \times 10^{-24}$ cm.$^2$ and an isotopic abundance of 4.4% in natural chromium. Approximately 0.9 gm. spectroscopically pure chromium sesquioxide was packed into a cavity 0.8 x 18.8 x 53.6 mm. in 99.9% aluminum and irradiated in an A.E.C.L. NRU production capsule (Type 2, SWG No. CP36–C–168) for 63 days at an average flux of about $2.1 \times 10^{14}$ n./cm.$^2$/sec.

In the experimental equipment described in FIG. 1, tube 2 was nominally of 3″ inside diameter (7.65 cm.) with a wall thickness of 5⁄16″ (8 mm.). The collimator space 5 was 1 cm. wide, 6 cm. high and 7.5 cm. long and produced a fan-like beam of photons approximately 2 cm. wide and 14 cm. high where it intercepted the axis of the pipe. The detector collimator 10 was 6 cm. long, 1 cm. wide at the entrance 16, and 2 cm. wide adjacent the detector 11. In this arrangement, the Compton scattering angle was nominally 90° ± 10°, but since the beams from the source and to the detector respectively are closely collimated only in the planes parallel to the pipe axis, scattering angles of as much as 125° can occur. The most probable scattering angle is therefore slightly greater than 90°.

The 323 kev. photons leaving source 3 have $k_o = 0.634$ and are reduced in energy by a factor 1/1.634 to 198 kev. by a 90° scattering process. The width of the scattered photon energy peak due to the ±10° range of scattering angles is calculated to be ±14 kev., which is comparable to the resolution of the NaI (T1) scintillator 11 and photomultiplier 12. The most probable energy among the fog scattered photons found experimentally was 192 kev., corresponding to a scattering angle of approximately 95°.

Figure 2:
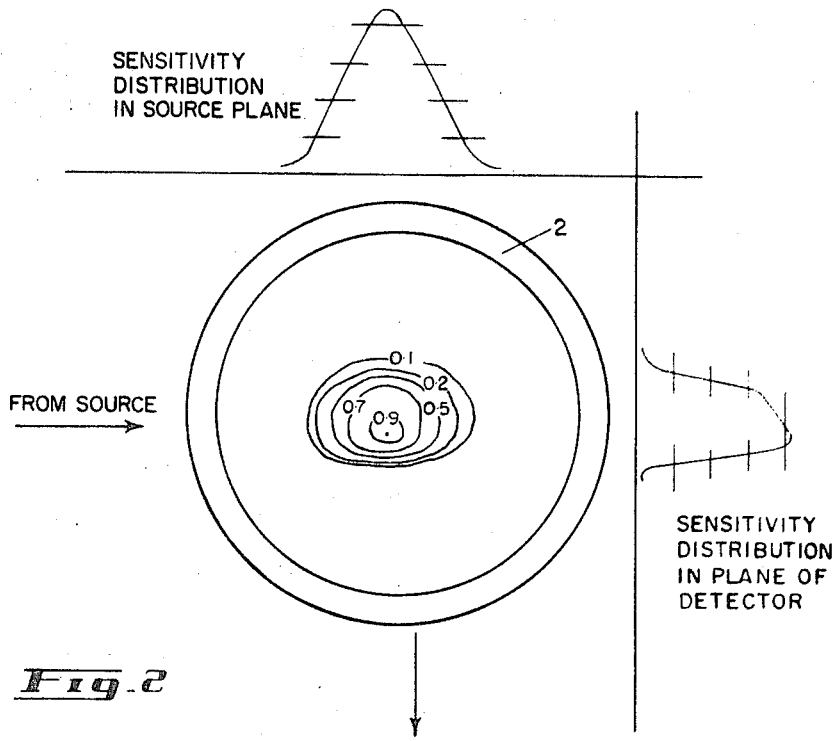
FIGURE 2 shows diagrammatically the sensitive volume for Coulomb scattering in the apparatus of FIGURE 1.

Having reference now to FIGURE 2, there is shown a graph obtained by measuring the total count of photons as scattered by a wire parallel to the axis of tube 2 in various positions about this axis. The contours represent regions of equal counting rate due to the scattering wire and are dependent upon the product of the solid angles subtended by the source and detector. It is clear from these figures that with the particular source and collimators described, a pipe of internal diameter considerably smaller than the three inch tube used could be employed possibly down to about one and a half inches without serious change in performance.

Figure 3:
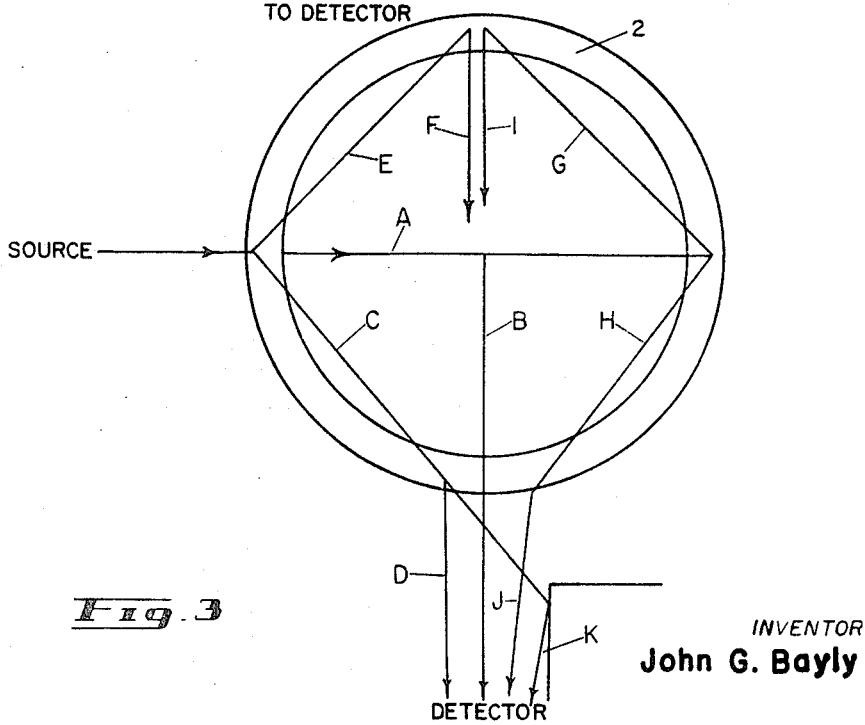
FIGURE 3 shows diagrammatically the principle scattering paths for photons scattered by the dense material of the tube in the apparatus of FIGURE 1.
Figure 4:
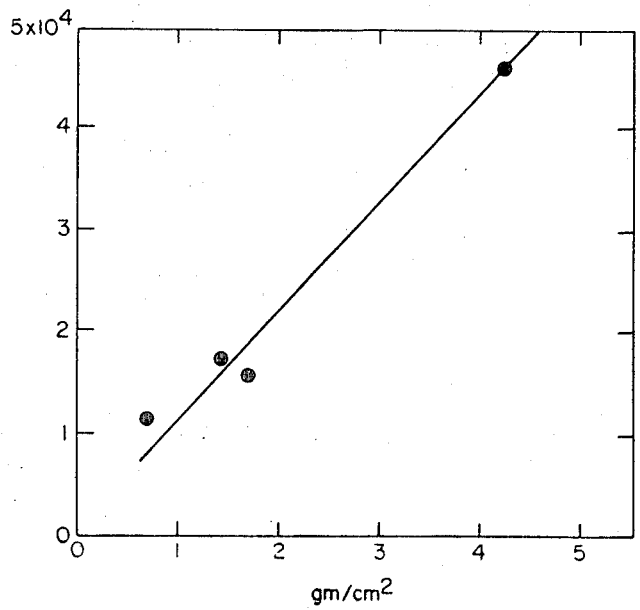
FIGURE 4 shows a graph of background counting rate in arbitrary figures against pressure tube wall thickness expressed in grams per square centimeter of surface as detected by the detector of FIGURE 1, in the apparatus of FIGURE 1.

In addition to the photons scattered by the fog 1, the detector 11 can respond to photons scattered by the collimators 5 and 10 and by the material of the confining tube 2. The geometry of the apparatus shown in FIGURE 1 is such that the detector can respond to photons other than those scattered by the fog 1 only if they have been scattered at least twice. The principal paths followed by such photons are shown in FIGURE 3. This figure, in conjunction with Table 1, shows the most probable energies for the fog scattered and wall scattered photons, as well as the K($\alpha$) fluorescent X-rays produced by the lead collimators. It will be noted that the wall scattered photons, which account for most of the background radiation, are strongly attenuated in their path along a chord of the circular tube 2. Without this attenuation, the background would vary as the square of the wall thickness, since the probability of two successive events is the product of the probabilities of each, and each probability is proportional to the amount of material penetrated. In the circumstances, however, as shown in FIGURE 4, the background counting rate is practically a linear function of the wall thickness of the tube 2. The advantage of this is that heavy wall tubing may be used with only a moderate loss of sensitivity due to increased background and reduced intensity of fog scattered photons.

TABLE 1

| Scattering path (see Fig. 2) | Nominal scattering angle, ° | Energy (kev.) |
| --- | --- | --- |
| A | 0 | 323 |
| B | 90 | 198 |
| C | 45 | 271 |
| D | 45+45 | 234 |
| E | 45 | 271 |
| F | 45+135 | 142 |
| G | 135 | 155 |
| H | 135 | 155 |
| I | 135+135 | 102 |
| J | 135+45 | 142 |
| K | Lead fluorescence | 70 |

In developing the experimental apparatus of FIGURE 1, it was not convenient to conduct investigations on steam under high pressure, but the scattering properties of fogs of several different steam qualities were simulated by readily available low density substances. The fogs of interest have specific gravities between .03 to .3 gm./cc. Polystyrene foam and other foamed plastics were used to simulate the low density end of this range, while ordinary rubber foam density 0.125 gm./cc. and cellulose felt density .056 gm./cc. were equivalent to wetter fogs of lower steam quality and higher density. The fog spectrum derived from using these substances very closely resembles that which a true water fog would produce since the scatterers used, in common with water, contain only elements having low atomic numbers and in which the Compton scattering is by far the most probable type of interaction between the photons of the energy concerned and the atoms involved. The recoil electrons and any photo-emitted have so small a range that they do not reach the detector.

FIGURE 5 shows a curve A, the spectrum obtained from the pressure tube and collimator system alone in the absence of fog and curves B, C and D show the spectrum obtained in the presence of simulated fog from which that in the absence of fog has been subtracted. Thus curves B, C and D represent the spectra of the fog scattered photons for densities of .1, .06 and .02 gm./cc., respectively.

The "fog" spectra consist mainly of a peak centered at the energy, 198 kev., resulting from 90° scattering, with a width of ±27 kev. Smaller peaks at 120 kev. and 70 kev. are presumably due to multiple scattering and the lead $k(\alpha)$ fluorescence. The areas under these curves are proportional to the densities of the simulated fogs, but to obtain the best accuracy it is necessary to count only those pulses in the main peak. This can be done by using a single channel amplifier adjusted to count pulses produced by the detector 11 of such height that they represent the energy range $E_1 < E < E_2$. The specific gravity is then proportional to $D = F - B$, where $$F = \int_{E_1}^{E_2} f(E) \, dE \text{ and } B = \int_{E_1}^{E_2} b(E) \cdot dE$$

are the counting rates with and without steam in the pipe. The functions $f$ and $b$ are the energy distributions with and without fog. D, F and B are the numbers of counts in a fixed peeriod of timee.

The best values for $E_1$ and $E_2$ are those which provide the best signal/noise ratio for D. The R.M.S. noise fluctuations in D can be shown to be $(F+B)^{1/2}$. Hence $E_1$ and $E_2$ should make $$\frac{(F-B)}{(F+B)^{1/2}} = \frac{(F-B)^2}{(F+B)}$$

a maximum. If $F \approx B \gg F - B$, as is the case here, then $E_1$ and $E_2$ are the values which make $$\frac{f-b}{b} \approx \frac{D}{2B}$$

Inspection of the functions $(f-b)$ and $b$, shown in FIGURE 5, gave $E_1 \approx 160$ kev., $E_2 \approx 221$ kev. for the scatterer with a specific gravity of 0.056.

In this energy interval D was 8262 min.$^{-1}$, B was 19215 min.$^{-1}$, giving an R.M.S. uncertainty in D of $$(F+B)^{1/2} = (2B+D)^{1/2} + 216 \text{ min.}^{-1}$$

Hence the finite number of counts produced an uncertainty in the specific gravity of 0.00146. This error, resulting chiefly from the background spectrum, is almost independent of the fog density. It can be reduced by reducing the background scattering probability or by increasing the source strength or counting time.

To obtain D, it is necessary to subtract B from the experimentally measured F. B depends not only on the exponentially decaying source strength, but also on the geometry of the system and the possible radioactive contaminants in the steam. It would therefore be desirable to measure B as well as F. This is impractical, since it would involve interrupting the steam flow, but a quantity closely approximating B can be obtained by counting in an energy range in which relatively few pulses originate in the fog. The range of 100 to 150 kev. has been used successfully.

Figure 6:
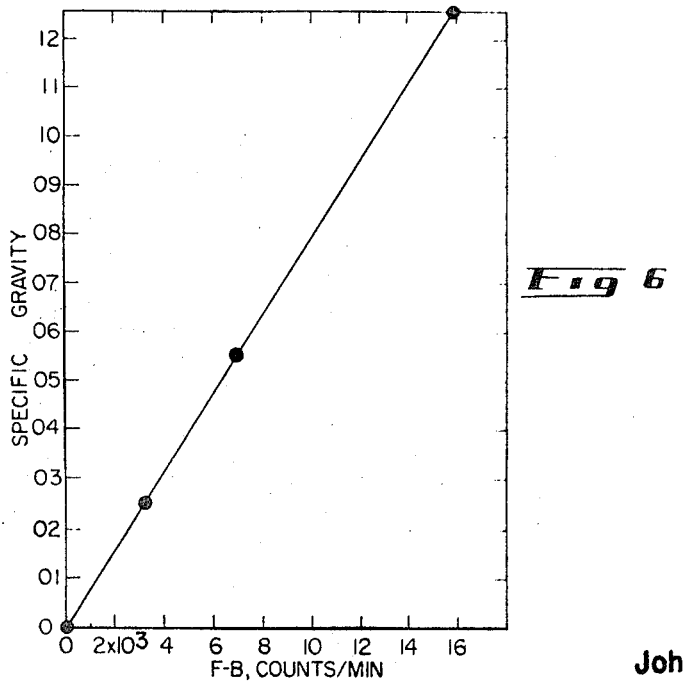
FIGURE 6 shows a graph of the relationship between fog specific gravity and the counting rate difference $F-B$ as defined in the specification.

FIGURE 6 shows the results obtained for scatterers of three different densities when B and F are obtained simultaneously in adjacent energy ranges using a two channel amplifier, each channel responsive to the different range of pulse heights from the detector photo-multiplier system. In an engineered version of this equipment a differential counting rate meter such as the Victoreen Model 2 CRM-2D can be used to display a reading proportional to D, i.e. to the product of source strength and specific gravity.

Figure 7:
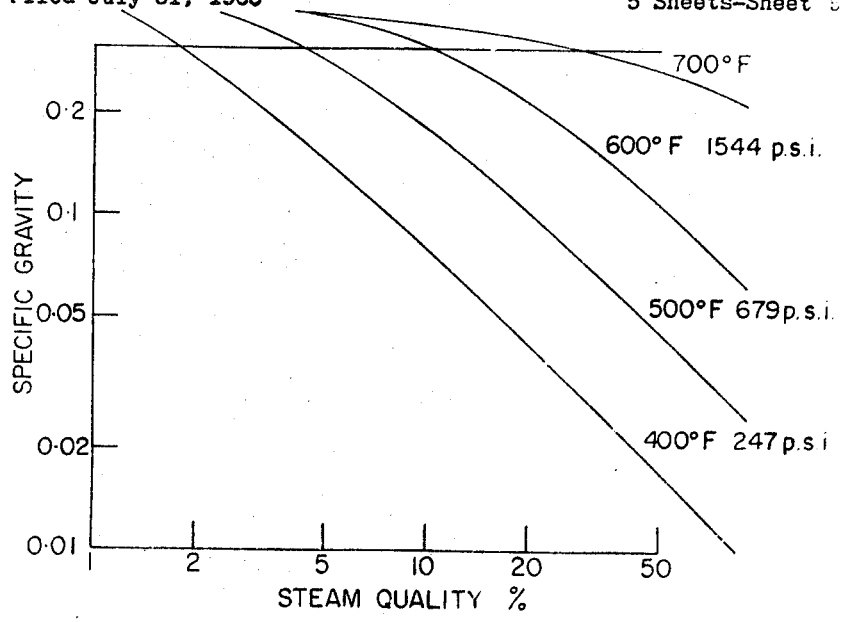
FIGURE 7 shows a graph of specific gravity of fog against the quality of the fog.

The conversion from specific gravity to steam quality depends upon the steam temperature or pressure. FIGURE 7 shows a graph relating these variables.

The measurement of the specific gravity of a relatively small sample of the contents of a steam tube make it possible to estimate the steam quality in this small sample, since the only additional information required is the temperature or pressure and an approximate value for the slip, or ratio of velocities of the two phases if the fog is undergoing a change of state as it passes through the tube. If the liquid phase travels at a fraction $1/S$ of the velocity of the gas phase, the steam quality is $$Q = \left(1 + \frac{d_e}{d_g} \cdot \frac{d - d_g}{d_e - d} \cdot \frac{1}{S}\right)^{-1}$$

where $d$, $d_g$ and $d_e$ are the specific gravities of the fog mixture (measured) of the gas and of the liquid (known functions of temperature or pressure). Thus for a steam quality of 0.50, an uncertainty of 10% in S introduces an error of only 0.025 in Q.

The mean steam quality for the whole tube can be found by measuring the specific gravity as a function of position by scanning the sample volume across the tube. If the phase velocities are known, a simple calculation then gives the mean quality.

Alternatively, if flow conditions are reproducible, a calibration curve may be made by correlating specific gravity at a fixed reference point with the mean quality as found by separating the phases for individual measurements of gas and liquid flow. The reference point for such a calibration should presumably be the central axis of the tube, where velocities are greatest and the fog makes the most significant contribution to the mean steam quality.

One of the advantages of the scattering method over the transmission method of fog measurement may be seen by considering, as an example, the measurement of a fog of specific gravity 0.03. In the tube used here the measured quantity, $F-B$, was 11.7% of B.

To achieve a similar result by the direct transmisson method the attenuaton in the fog would have to be about 11.7%. This, in a path length of 7.5 cm., a density of 0.03 gm./cc., requires a mass absorption coefficient of approximately 0.52 cm.$^2$/gm., or a photon energy of 25 kev., to which the pressure tube would be completely opaque. At an energy of 100 kev., at which the pressure tube would transmit 0.1% of the incident radiation, the fog attenuation would be 3.8% of this. For a given maximum counting rate set by the detector, the loss of a factor of three in $$\frac{F-B}{B}$$

can be overcome by increasing the counting time by a factor of nine. Thus the transmisson method would requre approxmately nine times longer to achieve the accuracy of the scattering method. Furthermore, the transmission method, which measures only the average density across a diameter of the pipe, cannot readily provide the detailed density distribution obtainable by the scattering method.

The ability to measure both B and F simultaneously is another significant advantage. This reduces the effect of changes in source strength, changes in the geometry of the apparatus, and the effect of radioactive contaminants in the steam. In principle, errors due to the last effect can be made negligible by proper selection of the spectral range used for B.

If a different counting rate meter is used to produce $F-B$, the specific gravity measurement can be made independent of source strength, detector sensitivity, attenuation of the walls etc., by dividing the difference, $F-B$, by the background rate, B. Meters which produce a deflection proportional to the ratio of two currents are available; many strip chart recorders can be used in this way. It is thus possible to make the instrument read specific gravity directly.

A reduction in the sampled volume is necessary if the method is to be used to study the distribution of water particles in a pressure tube containing a heat source, for example. The high degree of collimation encountered for such an application is possible only with lower energy photons. The width of the collimated beams may be readily reduced from the order of 1″ to .1″, but further reduction, to say 0.010″ or 0.25 mm. may require lower energy photons. A suitable compromise would be found betwen 90 and 100 kev., where lead absorbs strongly due to its K absorption. The high intensities needed may be obtained from an X-ray machine. A target current of 10 ma. at 100 kev., well stabilized, would be adequate.

As previously mentioned, the quality of a fog is $$Q = 1 + \frac{d_e}{d_g} \cdot \frac{d - d_g}{d_e - d} \cdot \frac{1}{S} - 1$$

in which the liquid and gas densities $d_e$ and $d_g$, determined by the fog temperature, and the slip S are approximately constant while $d$ is the density of the mixture. $d$ is proportional to $F-B$, the increase in counting rate caused by the fog.

Since both F and B can be measured simultaneously, $d$ can then be expressed as $$d = k \cdot \frac{F-B}{B}$$

where $k$ is a constant independent of changes in source strength detector, sensitivity, etc.

Inserting this value for $d$ is the expression for Q, it can be shown that $$Q(kd_eF - (kd_e - d_ed_g)B) = (1-Q)S((kd_g + d_ed_g)B - kd_gF)$$

Typical values of these parameters, applying at 500° F., are $$k=0.05,\ d_g=0.0238,\ d_e=0.782,\ S=1$$

Introducing these values, and simplifying, gives $$Q(0.685F - B) = (1-Q)0.3435(B - 0.0601F)$$

Figure 8:
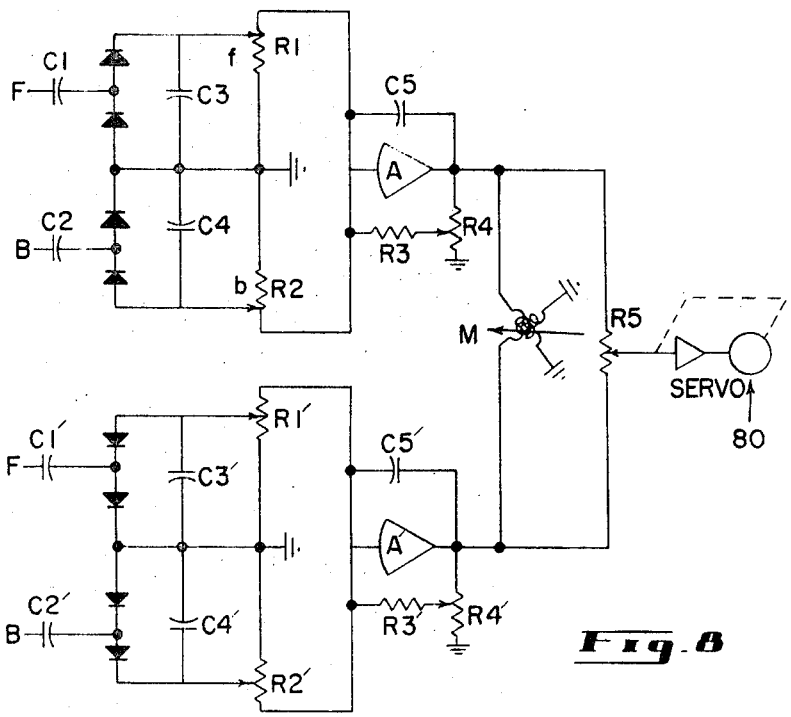
FIGURE 8 is a schematic diagram of a circuit for giving a direct meter reading of steam quality.

A novel feature of the circuit shown in FIGURE 8 is the method of generating Q from this equation.

In FIGURE 8, amplifier A generates a voltage proportional to $(fFC_1 - bBC_2)R_3$, where $f$ and $b$ are the settings of the potentiometers $R_1$ and $R_2$ respectively. Since these are arbitrary constants, they can be given values such that $fC_1R_3 = 0.685$, and $bC_2R_3 = 1$. If potentiometer $R_4$ is set at 0.3435, the amplifier output voltage is $$\frac{(0.685F - B)}{0.3435}$$

Similarly, the primed circuit can produce $-(B-0.0601F)$, the negative sign occurring because the diodes involved have been reversed.

The meter M is one which measures the ratio of two currents. Such instruments are made, for example, by Thomas A. Edison Incorporated, West Orange, N.J. Its scale can be calibrated directly in terms of Q, since the ratio of the currents is $$\frac{1}{Q} - 1$$

Alternatively, a servo-type recorder 80 can be connected, as shown, to locate the zero voltage point on a resistor $R_5$. The two portions of $R_5$ will then be in the ratio $$Q/1-Q$$

and the recorder will read Q directly.

Since $d_e$ and $d_g$ are temperature dependent, it may be necessary to introduce a correction factor if the temperature deviates from 500° F. This factor may be included in the coefficient of $R_4'$.

The values of the resistances $R_1$ and $R_4$ are not significant: in one embodiment they are 5000 ohms. $R_3$ and $C_5$ are chosen so that their time constant $R_3C_5$ gives the circuit adequate smoothing without reducing the speed of response too much. In this case $C_5$ was 1 μf., $R_3$ is 4.7 megohms, giving a time constant of 4.7 seconds when $R_4$ is set at its maximum value.

The input circuits shown in FIGURE 8 depend upon pulses which are of unit amplitude introduced at F and B. Thus, each F pulse charges $C_1$, and at the end of the pulse, the diode pump passes the charge to $C_3$. Since $C_3$ is large (1.0 μf.), its voltage rises by a very small amount, and virtually all of the $C_1$ charge is transferred. Hence, if there are F pulses per second, a current of $C_1F$ amperes flows into $C_3$ and hence into the slider of $R_1$. Of this current, a fraction $f$ flows through the $(1-f)R_1$ ohms in the top portion of $R_1$, while the remaining fraction, $1-f$ flows through the $fR_1$ ohms to ground. (For each path, the voltage drop is $fC_1F(1-f)R_1$ volts.) The amplifier input then receives $fC_1F$ amperes from the F pulses.

Similarly, this circuit obtains $-bC_2B$ amperes from the B pulses. The polarity reversal is achieved by reversing the diodes.

Finally, the input receives a feedback current proportional to the output voltage V, the setting $r$ of the slide on $R_4$, and inversely proportional to $R_3$. The feedback current is then $rV/R_3$, and since the sum of amplifier input currents is zero, we have $fC_1F-bC_2B+rV/R_3=0$.

Thus the output voltage is $$V = \frac{-R_3}{r}(fC_1F - bC_2B)$$

volts per volt of input pulse amplitude. V can be multiplied by 1/0.3435 by making $r=0.3435$. The contributions from F and B are in the ratio of $fC_1F:bC_2B$, and this ratio should have the value $0.685F:B$. Since the magnitude of V can be adjusted by $r$, only the relative proportions contributed by F and B are important.

I claim:

1. Apparatus for determining the density of a light substance confined by a material of greater density comprising, means for mounting a photon source, said source emitting a flow of photons which are essentially monokinetic at an energy sufficient to pass through said confining material after single Compton scattering by electrons in said substance, means for collimating photons from said source for incidence upon said substance, means for collimating photons scattered by electrons in said substance at a predetermined angle to said incident photons, single detector means for detecting intensity of said collimated single Compton scattered photons and also for detecting intensity of photons scattered other than by said Compton scattering corresponding to the intensity of said incident photons, said detector means comprising, means for generating output pulses of amplitude dependent upon energy of photons encountered by said detector means, means for selecting pulses of a first predetermined amplitude range corresponding to said Compton scattered photons, and of a second predetermined amplitude range corresponding to said other scattered photons, and means for subtracting the detected intensity of said pulses of the first amplitude range from that of the second amplitude range, the subtracted difference being a function of the density of said light substance.

2. Apparatus as defined in claim 1 comprising counting means for said pulses of said first amplitude range corresponding to said Compton scattered photons and counting means for said pulses of said second amplitude range corresponding to the energy of said other scattered photons, and said subtracting means operating upon output from said counting means.

3. Apparatus as defined in claim 2 wherein said subtracting means comprises voltage differential determining means.

4. Apparatus as defined in claim 1, said collimators and said material defining a path for said other scattered photons requiring at least two scattering events for each of said other scattered photons intercepting said detector means.

5. Apparatus as defined in claim 1, said source comprising an emitter for photons in an energy range of about 300 kev. to about 500 kev.

6. Apparatus as defined in claim 1, said predetermined angle being about 90°.

7. Apparatus as defined in claim 1, said detector means comprising a scintillation detector.

8. Apparatus as defined in claim 2, said first amplitude range corresponding to photon energy of about 160 kev. to about 221 kev.

9. Apparatus as defined in claim 2, said second amplitude range corresponding to photon energy of about 100 kev. to about 150 kev.

10. Apparatus as defined in claim 4, said material comprising a hollow tube, said substance being enclosed within said tube.

11. Apparatus as defined in claim 5, said photon source comprising $Cr^{51}$.

12. Apparatus as defined in claim 1, comprising means for dividing said subtracted difference by said detected intensity of pulses of said second amplitude range.

References Cited

UNITED STATES PATENTS 2,997,586  8/1961  Scherbatskoy.
3,183,351  5/1965  White.

ARCHIE R. BORCHELT, Primary Examiner

U.S. Cl. X.R.

250—71, 83.3